J. W. BANCROFT & T. WALKER.
Assignors of part interest to S. H. SAFFORD.
Amalgamators.
No. 8,175. Reissued April 16, 1878.
Fig. 1
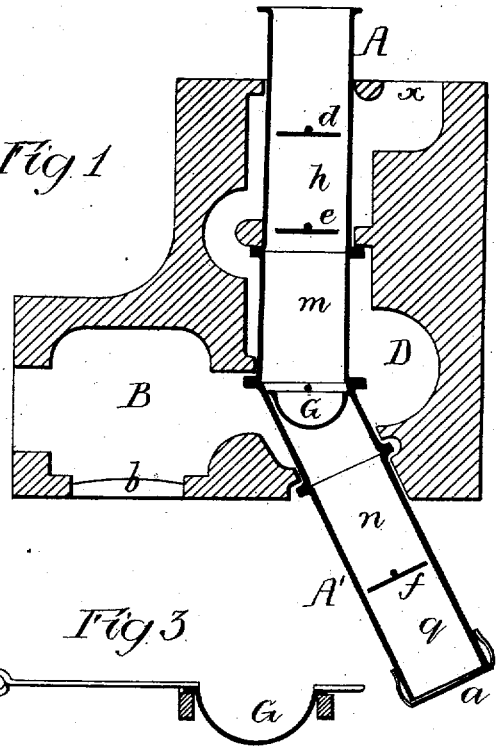
Fig. 3
Fig. 2
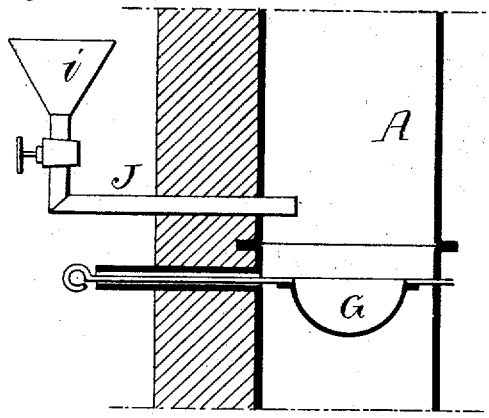
Fig. 4
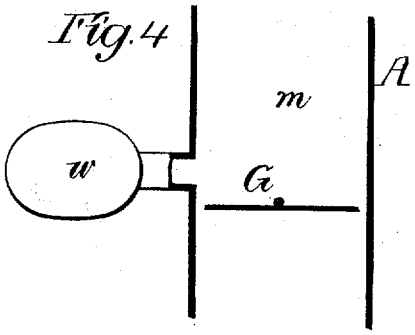
Witnesses
John M. Kleiner
Harry Smith
Inventors
Joseph W. Bancroft
and
Thomas Walker
by their Attorneys
Howson and Son
N. PETERS, PHOTO-LITHOGRAPHER, WASHINGTON, D. C.

UNITED STATES PATENT OFFICE.

JOSEPH W. BANCROFT AND THOMAS WALKER, OF PHILADELPHIA, PENNSYLVANIA, ASSIGNORS OF PART INTEREST TO S. H. SAFFORD.

IMPROVEMENT IN AMALGAMATORS.

Specification forming part of Letters Patent No. 170,329, dated November 23, 1875; Reissue No. 8,175, dated April 16, 1878; application filed December 26, 1877.

*To all whom it may concern:*

Be it known that we, JOSEPH W. BANCROFT and THOMAS WALKER, both of Philadelphia, Pennsylvania, have invented an Improved Amalgamating Apparatus, of which the following is a specification:

The object of our invention is to effectually amalgamate ores by subjecting them to a gradually-increasing heat while they are acted on by the vapors of mercury; and a further object of our invention is to construct apparatus whereby the process of amalgamation may be continued with but little interruption.

In the accompanying drawing, Figure 1 is a vertical section of apparatus wherewith our invention may be carried into effect; Fig. 2, a vertical section on the line 1 2, Fig. 1, of part of the apparatus, drawn to an enlarged scale; Fig. 3, a detached view of the cup-shaped valve referred to hereinafter; and Fig. 4, a diagram illustrating a modification of our invention.

A is a retort, the lower portion A′ of which is, by preference, continued in an inclined direction from the upper portion, the lower end being furnished with a detachable plate, *a*, or other equivalent contrivance.

The greater portion of the retort is contained within a suitable furnace, of which B is the fire-place, *b* the grate, and D a flue, through which the products of combustion take a circuitous course, in contact with the retort, until they escape at *x* to the chimney.

A portion of the retort projects above the furnace, so as to be exposed to the air, and so that the ore within this exposed portion may be comparatively cool. The lower portion of the retort is similarly exposed.

Within the upper portion of the retort we arrange one or more valves, *d* and *e*, which we prefer to make like ordinary throttle-valves, the spindles passing through the brick-work of the furnace, so that either valve can be made to assume a horizontal position or a perpendicular position, as may be desired. It should be understood that these valves either fit so freely within the retort or are so perforated that the vapors of mercury, referred to hereinafter, can pass upward, the valves being merely supporters of the pulverized ore.

At or near the junction of the upper with the lower portion of the retort we suspend within the same a cup-shaped valve, G, having trunnions adapted to bearings, as shown in Fig. 3, one of the trunnions projecting through the brick-work, and being provided with a handle, so that the valve may be tilted and its contents discharged into the lower portion of the retort. This valve is so tight to its seat when closed as to cut off the communication between the upper and lower portions of the retort, this lower portion being provided with a valve, *f*, similar to the valves *d* and *e*.

In using the above-described apparatus the pulverized ore containing the precious metals is permitted to pass from a hopper into the upper portion of the retort, where it is supported by the valve *d*. Then, by tilting this valve, the ore is permitted to fall onto the valve *e* of the chamber *h*, a fresh supply of ore being introduced into the top of the retort, where it remains in a comparatively cool condition, and effectually prevents the upward escape of the vapor of the mercury, which has been deposited in the receptacle of the valve G by pouring it into the funnel *i*, and permitting it to flow thence through the pipe J into the said receptacle. The charge of ore, having been gradually heated in the chamber *h*, and, while thus gradually heated, subjected to the action of the mercury-vapors, is now permitted to fall onto the valve G by tilting the valve *e* preparatory to the introduction of a new charge of ore into the said chamber *h*.

In the chamber *m* the ore is subjected to the direct action of the vapors of mercury, and after it has remained in this chamber for a sufficient length of time the cup-like valve G is tilted, and the contents of the chamber discharged into the chamber *n* in the lower portion A′ of the retort, where it is permitted to become somewhat cool, and is finally discharged into the lowest chamber *q*, from which it may, after closing the valve *f* and by removing the cover or plate *a*, be permitted to fall into water, where it can be washed in the usual manner, so as to separate the earthy particles from the amalgamated metals, which may be separated by the usual treatment.

Although we prefer the placing of the mercury in the receptacle of the valve G, this is not absolutely essential to our invention. There may, for instance, be a vessel, *w*, projecting from one side of the retort into the flue of the furnace, as shown in Fig. 4, or into a separate furnace, the mercury being introduced into this vessel through a pipe projecting through the side of the furnace, and the vapors passing into the retort at a point above the valve G.

It will be seen that the operations of charging the retort with ore, subjecting the latter to the vapor of mercury, and the discharge of the heated ore from the retort may be conducted without any material interruption.

We have found that the best results are attained by subjecting the ore to a gradually-increasing heat while under the influence of the vapors of mercury.

We claim as our invention—

1. The mode herein described of amalgamating pulverized ore, which consists in subjecting the ore to a gradually-increasing heat while it is subjected to the action of the vapors of mercury, all substantially as set forth.

2. The mode herein described of preventing the escape of the vapors of mercury from an amalgamating-retort, which mode consists in maintaining in the path of the vapors and within the retort a mass of ore cool enough to effect the condensation of the vapors, all substantially as specified.

3. An amalgamating-retort extending beyond the fire-place of the furnace, and provided with means, substantially as described, for permitting the gradual passage of the amalgamated ore through the same, so that the latter is cooled before its discharge from the retort, as set forth.

4. An amalgamating-retort combined with a furnace, and having a movable valve, G, for supporting a charge of ore while it is being subjected to a vapor of mercury, and for discharging the ore, all substantially as set forth.

5. The cup-shaped valve G, hung within the retort, in combination with the pipe J, through which mercury may be introduced into the receptacle of the valve, all substantially as set forth.

6. The combination, in the retort, of a tight-fitting ore-supporting valve, G, with valves *e* and *d*, for supporting the ore without obstructing the outward passage of the vapor of mercury, as specified.

7. The combination, in the retort, of the valves G and *f* and a stopper or cap detachable from the lower end of the retort, as set forth.

In testimony whereof we have signed our names to this specification in the presence of two subscribing witnesses.

JOS. W. BANCROFT.
THOS. WALKER.

Witnesses:
RICHARD L. GARDINER,
HARRY SMITH.